United States Patent

[11] 3,609,144

[72] Inventor Richard W. Hein
Ridgefield, Conn.
[21] Appl. No. 738,400
[22] Filed June 20, 1968
[45] Patented Sept. 28, 1971
[73] Assignee Escambia Chemical Corporation
Pace, Fla.

[54] 1,4,6-OXADIAZOCINES
8 Claims, No Drawings
[52] U.S. Cl. .................................................... 260/239.3,
117/139.4, 424/244
[51] Int. Cl. ................................................... C07d 87/54
[50] Field of Search ............................................ 260/239.3

[56] References Cited
UNITED STATES PATENTS
3,483,189  12/1969  Brotherton et al. ............  260/239.3

Primary Examiner—Henry R. Jiles
Assistant Examiner—Robert T. Bond
Attorneys—B. Max Klevit and David T. Nikaido ABSTRACT: Production of the novel compounds 4H,6H-3,3,8,8-tetramethyl-2,5,7 trioxo-1,4,6-oxadiazocine, halogen derivatives thereof, and 4H,6H-3,3,8,8-tetramethyl-2,7-dioxo-5-thio-1,4,6-oxadiazocine. The compounds 4H,6H-3,3,8,8-tetramethyl-2,5,7, trioxo-1,4,6-oxadiazocine and 4H,6H-3,3,8,8-tetramethyl-2,7-dioxo-5-thio-1,4,6-oxadiazocine are both useful as crease resistant agents for cloth and are believed to have worthwhile sedative and hypnotic properties whereas the N,N-dihalo derivatives of 4H,6H-3,3,8,8-tetramethyl-2,5,7 trioxo-1,4,6-oxadiazocine are useful as bactericides.

1,4,6-OXADIAZOCINES

This invention relates to the production of the novel compounds 4H,6H-3,3,8,8-tetramethyl-2,5,7 trioxo-1,4, 6-oxadiazocine, hereinafter referred to as TTO, halogen derivatives of TTO, and 4H, 6H-3,3,8,8-tetramethyl-2,7-dioxo-5-thio-1,4,6-oxadiazocine, hereinafter referred to as TDTO.

It is an object of the present invention to prepare the new chemical compounds TTO, and TDTP, and derivatives thereof.

It is also an object of the present invention to provide novel processes to produce the novel chemical compounds TTO and TDTO, and their derivatives.

Other and further objects of the present invention will be apparent to those skilled in the art from reading the present disclosure.

The compound, TTO, finds utility as a crease-resistant agent for cloth and it also is believed to have worthwhile sedative and hypnotic properties. The compound, TDTO, has the same utility.

The N,N'-dibromo and dichloro derivatives of TTO are bactericides and find utility as slow-releasing halogenating agents in swimming pool water treatment.

According to the present invention, it has been discovered that the reaction of tetramethylglycolide, hereinafter referred to as TMG, and urea produces TTO. In an analogous manner, it also has been discovered that the reaction between TMG and thiourea produces TDTO, a compound similar to TTO. It is quite unexpected that the cyclical compounds, TTO and TDTO, would be formed from the reactants since it is known that nucleophilic agents, such as urea, react with lactones to yield open-chain products. For example, O-phenylene diamine, a nucleophilic agent, and propiolactone react to yield an open-chained diamide according to the following reaction:

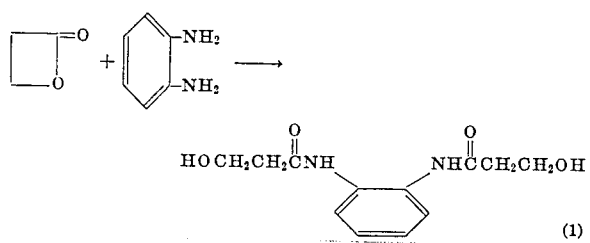

In view of this normal chain-breaking effect of nucleophilic agents, it is surprising that the cyclical compounds of the present invention are produced.

The balanced equation for the chemical reaction for the production of TTO is as follows:

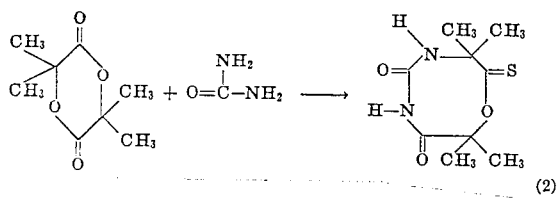

The balanced equation for the production of TDTO is as follows:

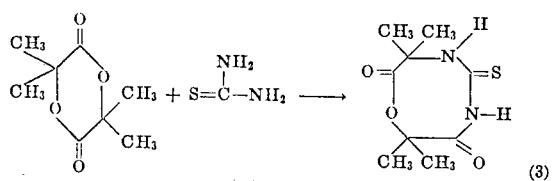

The N,N'-dibromo derivative TTO, to namely N,N'-dibrom-4H,6H-3,3,8,8-tetramethyl-2,5,7-trioxo-1,4,6-oxadiazocine, is produced according to the following reaction:

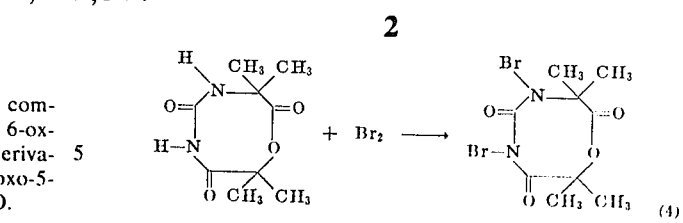

The N,N'-dichloro derivative of TTO N,N'-dichloro-4H, 6H-3,3,8,8-tetramethyl-2,5,7-trioxo-1,4,6-oxadiazocine, is produced according to the following reaction:

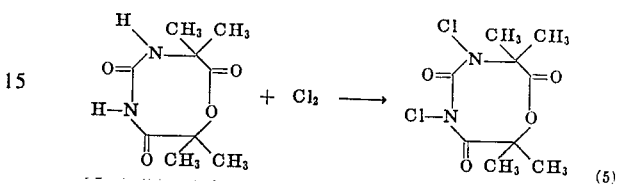

One of the important uses of the compound, TTO, is to improve the crease resistance of cotton. By way of illustration, a small piece (A) of cotton cloth was dipped in a mixture of TTO, (1.0 g.), 40 percent formalin (1.0 g.) and water (20.0 g.) for 2 hours. A second piece (B) of the same cotton was dipped into the solution, with TTO omitted, for 2 hours. A third piece (C) of the same cotton was untreated. The three cloths were dampened with water, folded in half, and placed under a flatiron overnight. The angle of the resultant crease was measured on the next day. Each cloth then was hung with a small weight attached to the bottom of the cloth in an attempt to "hang out" the crease. The cloths were hung for a day and the crease angle again was measured.

As shown in table, below, the cloth treated with TTO retained a larger crease angle than untreated cloth.

TABLE

| Cloth | CREASE ANGLE | |
|---|---|---|
| | Wet cloths under flat iron | Hung-out cloths with small weight |
| A | 100° | 140° |
| B | 90° | 120° |
| C | 90° | 120° |

In order more clearly to disclose the nature of the present invention, specific examples of the practice of the invention are herein given. It should be understood, however, that this is done by way of example and is intended neither to delineate the scope of the invention nor limit the ambit of the appended claims. Parts are expressed in terms of parts by weight, unless otherwise expressed.

Example 1

TMG (86 g.) and urea (30 g.) were mixed and heated to 185° C. for approximately 1.5 hours. The white solid product that formed was washed several times with water followed by one washing with acetone. The solid product, weighing 40 grams after drying in air, was TTO.

Example 2

TMG (86 g.) and thio urea (38 g.) were mixed and heated to 175° C. for approximately 1 hour. The pale yellow product was washed several times with water and recrystallized from nitromethane to yield TDTO.

Example 3

TTO (51 parts) was mixed with an excess of liquid bromine. To this mixture an excess of 20 percent aqueous sodium hydroxide was added. A large amount of solid product formed which was recrystallized from water to yield the N,N'-dibromo derivative to TTO (60 parts).

As will be apparent to those skilled in the art, the preparation of TTO and TDTO may be carried out in the presence of a reaction solvent. It is desirable that the mixture of TMG with urea or thiourea be heated to a temperature of about 140° to 180° C. so as to initiate the reaction. It is desirable that the reaction temperature not exceed about 290° C. The preferred reaction temperatures are between about 140° and 200° C.

The terms and expressions which have been employed are used as terms of description, not of limitation, and there is not intention in the use of such terms and expressions of excluding any equivalents of the features shown and described or portions thereof, but it is recognized that various modifications are possible within the scope of the invention claimed.

What is claimed is:

1. A compound selected from the group consisting of:
   a. 4H,6H-3,3,8,8-tetramethyl-2,5,7-trioxo-1,4,6-oxadiazocine, and
   b. 4H,6H-3,3,8,8-tetramethyl-2,7-dioxo-5-thio-1,4,6-oxadiazocine.

2. The compound 4H,6H-3,3,8,82,5,7-trioxo-1,4,6oxadiazocine.

3. The compound, N,N'-dibromo-4H,6H-3,3,8,8-tetramethyl-2,5,7-trioxo-1,4,6-oxadiazocine.

4. The compound N,n'-dichloro-4H,6H-3,3,8,8-tetramethyl-2,5,7-trioxo-1,4,6-oxadiazocine.

5. The compound 4H,6H-3,3,8,8-tetramethyl-2,7-dioxo-5-thio-1,4,6-oxadiazocine.

6. A process for the preparation of 4H,6H-3,3,8,8-tetramethyl-2,5,7-trioxo-1,4,6-oxadiazocine which comprises heating a mixture of tetramethylglycolide and urea to a temperature in the range of from about 140° C. to about 290° C.

7. A process for the preparation of 4H,6H-3,3,8,8-tetramethyl-2,7-dioxo-5-thio-1,4,6-oxadiazocine which comprises heating a mixture of tetramethylglycolide and thiourea to a temperature in the range of from about 140° C. to about 290° C.

8. The N,-N'-dihalogen derivatives of 4H,6H-3,3,8,8-tetramethyl-2,7-dioxo-5-thio-1,4,6-oxadiazocine.

PO-1050
(5/69)

UNITED STATES PATENT OFFICE
CERTIFICATE OF CORRECTION

Patent No. 3,609,144            Dated September 28, 1971

Inventor(s) Richard W. Hein

It is certified that error appears in the above-identified patent and that said Letters Patent are hereby corrected as shown below:

Column 1, line 9, delete "TDTP" and substitute --TDTO--.

Column 1, line 74, delete "dibrom" and substitute --dibromo--.

Column 3, line 7, delete second occurence of "not" and substitute --no--.

Column 3, line 19, delete "4H,6H-3,3,8,8257-trioxo-1,4,6ox-" and substitute --4H,6H-3,3,8,8-tetramethyl-2,5,7-trioxo-1,4,6-ox- --.

Signed and sealed this 11th day of February 1975.

(SEAL)
Attest:

RUTH C. MASON
Attesting Officer

C. MARSHALL DANN
Commissioner of Patents
and Trademarks